P. A. Spicer.
Harvester Cutter.
No. 97563.                    Patented Dec. 7. 1869.
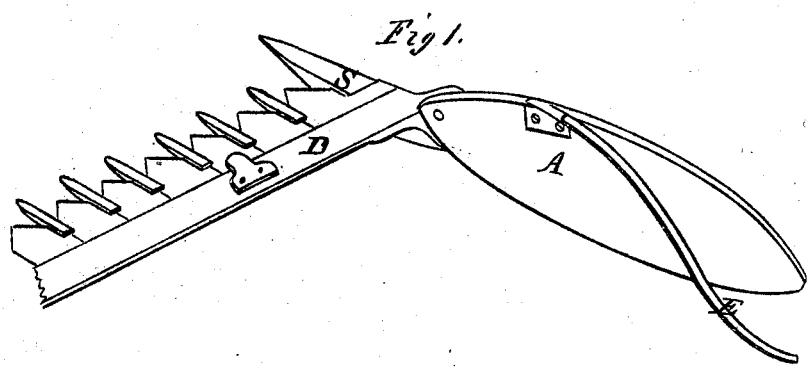
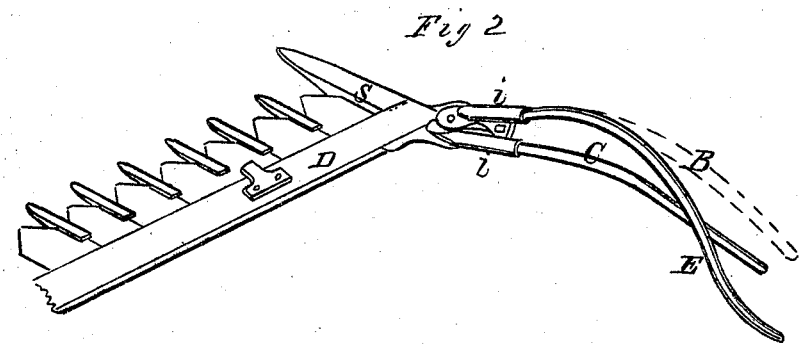
Witnesses                    Inventor
Peter Lockwood               Pratt A. Spicer
D. R. Smiley

United States Patent Office.

PRATT A. SPICER, OF MARSHALL, MICHIGAN.

Letters Patent No. 97,563, dated December 7, 1869.

TRACK-CLEARER FOR MOWING-MACHINES.

The Schedule referred to in these Letters Patent and making part of the same

*To all whom it may concern:*

Be it known that I, PRATT A. SPICER, of the city of Marshall, in the county of Calhoun, and State of Michigan, have invented a new and useful Improvement in "Dividers or Track-Clearers" to Mowing-Machines; and I do hereby declare that the following is a full, clear, and exact description of the construction and operation of the same, reference being had to the annexed drawings, forming a part of this specification, in which—

Figures 1 and 2 represent, in perspective, my invention, as applied to the two ordinary forms of dividers.

Similar letters of reference indicate like parts in both figures.

My invention relates to a device to form a part of a grass-divider, for the purpose of enabling such divider to clear itself gradually from accumulations of tangled grass; and the better to enable others skilled in this branch of agricultural mechanism to construct my invention, I will proceed to describe it.

The form and general arrangement of the dividers for grass, in common use, are shown at A in fig. 1, and B and C in fig. 2.

The former is simply a curved edged board, connected at the forward end to the shoe S, of the cutter-bar D, of a mowing-machine, and the latter, known as "swath-sticks," are round wooden bars, fitted to sockets $i$, pivoted adjustably together, and to a side seat in said cutter-bar shoe.

These swath-sticks stand so as to form a flattish inclined plane, ascending from the end connected with the shoe, and they are bent laterally toward the swath-side, in such manner that when drawn along behind the mower, they will divide and separate the cut from the standing grass, and leave a clear line of demarcation between.

When the grass to be mown is in good condition, and stands up well, the arrangements aforesaid operate as well as can be desired, but in dividing grass cut in a tangled and matted state, such dividers cannot free themselves, for the grass in such state clings to them in accumulating mass, and must be removed by hand, or if otherwise disengaged, will be left in large clumps on the swath.

The object of my invention is to enable grass-dividers to distribute this matted grass evenly on the swath, when they become loaded to a certain limited extent, without impairing their ability to divide grass cut in good condition, in the very best manner.

To accomplish this purpose, I so form the upper line or member of the divider, that from a proper point on the front ascending line, it will be deflected downward at any suitable angle of inclination to the ground, or nearly so, such deflected portion to stand at the proper angle of divergence from the dividing line, and it is immaterial, as far as practical working is concerned, whether this deflecting portion is composed of right lines or of curves, as seen in the drawings, but should it be continued quite to the ground, the extreme end should be turned upward, so as to slide, in the act of backing.

The manner in which I generally apply this deflecting line is shown at E.

It is represented in fig. 1 as a round wooden rod, bent downward, substantially as seen, toward the ground, and set, and secured to the upper side or edge of the board-divider A, at a proper horizontal angle of divergence.

The bent rod E may, if desired, be secured to the divider, in any of the well-known ways, so as to be capable of adjustment with it, and may be made of any suitable material.

Another mode is seen in fig. 2, where I bend the upper swath-stick, (see broken lines,) to form the deflecting rod E, or if deemed best, the upper swath-stick may be used intact, and the deflecting rod made separate, and connected and disconnected at pleasure, in any convenient way, if it is not considered best to make it a permanent member.

The operation of the deflecting rod E is as follows:

When matted or tangled grass has accumulated on the divider, portions of such grass keep moving down the incline of the deflecting rod E, until the drooping ends of the grass reach the surface of the swath.

The contact of the ends of the overhanging grasses produces a frictional adhesion to the stubble or ground surface, superior to the adhesion on the deflected rod, and as the rod is moving with the mower, it is drawn away from the grasses clinging around, and in this manner the accumulations on the divider are conducted and spread evenly on the swath.

I do not claim straight swath-sticks, or those curved only laterally, whether adjustable or not, as these are old, but having thus described my invention,

What I claim as new, and desire to secure by Letters Patent, is—

The upper swath-stick of a grass-divider, formed with a portion ascending from the base or socket $i$, and then deflected downward at any suitable angle of inclination to, or nearly to the ground, such deflected portion standing at the proper angle or curve of lateral divergence from the dividing line, whereby the fallen grass is first raised, and then cleared from the divider, and spread evenly on the swath, substantially as herein described and shown.

PRATT A. SPICER.

Witnesses:
PETER LOCKWOOD,
D. K. SMILEY.